Patented Aug. 16, 1949

2,479,486

UNITED STATES PATENT OFFICE 2,479,486

PREPARATION OF ADDENDUM COPOLYMER

Howard L. Gerhart, Milwaukee, Wis., assignor to Pittsburgh Plate Glass Company, Allegheny County, Pa., a corporation of Pennsylvania No Drawing. Application June 21, 1946, Serial No. 678,363

9 Claims. (Cl. 260—45.4)

1

The present invention relates to synthetic resins obtained by conjoint addendum polymerization of active olefinic groups in a plurality of unsaturated compounds and it has particular relation to the preparation of such resins by the conjoint polymerization of a polymerizable monolefin and α, β-unsaturated, α, β-dicarboxylic acid and a glycolic ester of a tetrahydrophthalic acid or anhydride. The application is a continuation-in-part of my copending application Serial No. 512,768, filed December 3, 1943, and entitled "Preparation of addendum copolymer," now abandoned.

One object of the invention is to provide olefin polymer resins of the above indicated type which are very hard, tough, and which are thermosetting.

A second object is to provide polymerizable mixtures which will polymerize rapidly and at low temperatures to the desired state.

These and other objects will be apparent from the following specification and the appended claims.

Resins have heretofore been prepared by conjointly polymerizing α, β-unsaturated, α, β-dicarboxylic acids such as maleic acid (or its anhydride) with a polymerizable unsaturated hydrocarbon containing a single active or ethylenic double bond such as styrene. These resins are heat softenable, low in impact strength, and are hard to plasticize. Plasticizers are also likely to leach out when the resin is contacted with a solvent and in many instances they tend to escape by evaporation.

In my copending application Serial No. 407,003, filed August 15, 1941, and entitled "Resinous composition and the method of preparing the same," Patent No. 2,361,019, is disclosed a resin obtained by conjointly polymerizing a polymerizable monolefin such as styrene, an α, β-unsaturated, α, β-dicarboxylic acid such as maleic acid and a polyester of a glycol such as diethylene glycol and one of the α, β-unsaturated, α, β-dicarboxylic acids (or anhydrides) such as a second portion of maleic acid.

This reaction proceeds very rapidly at moderate temperatures and the product is hard, tough, impact resistant, and resistant to softening by heat. Apparently the unsaturated valences of the nucleus of the α, β-unsaturated acid in the polyester retain sufficient reactivity that they will enter into conjoint polymerization with the other constituents. The resultant product is hard and tough and of good resistance to impact. There is no tendency to loose plasticizer by evaporation or by the action of solvents. In other words, the resin body is homogeneous and not a mixture. The resin components, before polymerization has gone too far, can be cast in molds or introduced by impregnation into cloth or ad-

2 mixed with fibers or fillers. The mixture can then be polymerized to a hard, tough state to provide castings, laminates, etc.

The present invention is based upon the discovery that the α, β-dicarboxylic, α, β-unsaturated acid esters of dihydroxy alcohols, notably the alkane diols or the dihydroxy ethers derived by condensation thereof, can be replaced in the foregoing esters by corresponding esters of tetrahydrophthalic acid or its analogues to provide products which, with styrene and maleic anhydride also polymerize quickly and at low temperatures to a hard, tough state.

The tetrahydrophthalic acid (or anhydride) and homologues contemplated herein can be easily prepared by subjecting an α, β-unsaturated cis α, β-dicarboxylic acid such as maleic acid (in anhydride form) or chloromaleic acid or their homologues to a Diels-Alder type reaction with a conjugate dienehydrocarbon such as butadiene, cyclopentadiene isoprene, or cyclohexadiene.

The formula of the anhydride of tetrahydrophthalic acid may be written:

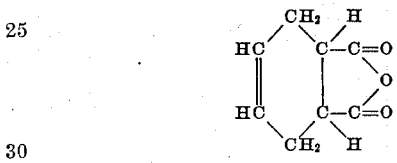

It is derived from maleic anhydride and butadiene.

The formula of endomethylene delta 4 tetrahydrophthalic acid anhydride or 3,6 endomethylene 1,2,3,6 tetrahydrophthalic anhydride (known as "carbic acid anhydride") derived from cyclopentadiene and maleic acid is written:

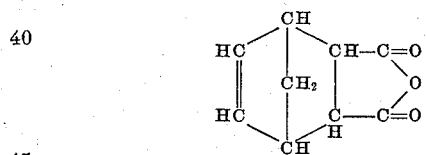

The reaction is discussed in greater detail in copending application Ser. No. 470,028, filed December 24, 1942, and entitled "Preparation of tetrahydrophthalic anhydrides," Howard L. Gerhart and Leon Adams, inventors, now Patent No. 2,423,234, July 1, 1947.

In the present application, both the anhydrides of tetrahydrophthalic acids and the free acids from which they are derived are contemplated and interchangeably can undergo esterification with dihydroxy alcohols to form the esters contemplated.

The acids or anhydrides will react with dihydroxy alcohols such as glycol, diethylene glycol, triethylene glycol, trimethylene glycol, or tetraethylene glycol or the like to form ester chains such as:

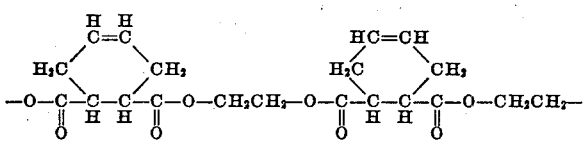

from tetrahydrophthalic acid and glycol, or

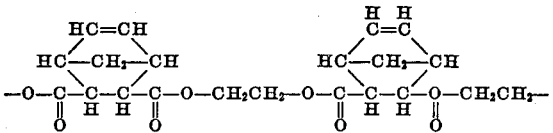

from endomethylene-tetrahydrophthalic acid and glycol.

It is to be observed that the cyclic residues of the acid molecule in the ester linkage each include an olefin linkage or double bond. The potential reactivity of this double bond is very high even though it is in a cyclic structure and is remote from the carboxyls, so that when the polyester is heated during the last stages of the esterification when the acid number approaches 10, the molecular chains cross link through the double bonds to form a three dimensional polymer which is very insoluble. Likewise a soluble polymer having an acid number of 40 or less will absorb oxygen at the double bonds and be converted to a partially oxidized resin which may easily become insoluble. Thus, it is seen that the double bond will very easily engage in polymerization reactions. Therefore, it is desirable to discontinue esterification before the gel stage is reached. Also an inert atmosphere should be maintained over the reactants and the resultant ester to prevent polymerization by oxidation.

Esters can be made with many common polyhydroxyl compounds but the esters which are most useful are those from alcohols having two hydroxyl groups, such as ethylene glycol, diethylene glycol, triethylene glycol, tetraethylene glycol, trimethylene glycol, etc. A very small amount of glycerine may be used to replace a portion of the glycol in the preparation of these esters. The glycerine tends to make the polyesters less soluble. The most desirable esters are those having an acid value of 40 or less, preferably below about 30 but not so low as to be unduly gelled. The acid value may be as low as 5 or 10. Usually the dihydroxy alcohol is employed in a ratio near molar with respect to the dicarboxylic acid component, but may be somewhat lower and may be considerably higher, e. g. 5 or 20% either way. These esters are prepared in the presence of an inert gas totally free of oxygen and they may be prepared by a method which involves the use of a solvent to facilitate the removal of the water. The procedure follows the general methods well known in the preparation of the polyester type resins. The following examples are illustrative of such methods:

Example A

A mixture of 164 parts of endomethylene tetrahydrophthalic anhydride and 116 parts diethylene glycol is heated as rapidly as is convenient to 180° C. under air reflux condensation. The temperature is raised gradually to 220° C. while a rapid stream of inert gas is passed through the liquid. The water formed in the esterification process is thus carried out of the reactor as rapidly as it is formed. Heating is continued at 220° C. until the liquid ester has an acid number of 40 or less. The ester is then cooled and stored in an inert atmosphere.

The reaction may also be conducted in a solvent substantially as follows:

Example B

Charge 146 parts tetrahydrophthalic anhydride, 116 parts diethylene glycol, and 20 parts xylol into a container equipped with a side arm take-off. Heat the mixture to boil off the xylol and water rapidly. Separate the water from the xylol and return the latter to the container substantially as rapidly as it distills. Continue to reflux until the acid number of the mixture is below 40 but not substantially below 10. Pass a rapid stream of inert gas through the liquid to free the finished ester of most of the xylol. Remove the last traces of the xylol at reduced pressures again in an inert atmosphere.

In the examples, the proportions are by weight.

It is again emphasized that these esters contain double bonds in the molecule and although they are not contiguous to the $\alpha,\beta$-dicarboxyl groups, they still retain a high degree of reactivity and are capable of entering into addendum reactions with styrene and $\alpha,\beta$-dicarboxylic, $\alpha,\beta$-unsaturated acids or anhydrides to form complex polymers that are very hard, tough, and which are thermoset to an infusible state. Any of the glycols including 1,2 or 1,3 propylene glycol, ethylene, diethylene, triethylene and tetraethylene glycol can be employed in this reaction, as in Examples A and B.

Resins as herein contemplated comprise as components:

(A) A polyester of a tetrahydrophthalic acid and a glycol;

(B) A monomeric olefin capable of cross linking the polyester molecules by addition; and (C) An $\alpha,\beta$-unsaturated, $\alpha,\beta$-dicarboxylic acid or anhydride, e. g. maleic anhydride.

The following constitute generalizations upon the compositions and the conditions of reaction involved in their preparation:

The ratio of styrene to polyester in the formulation preferably is such that for each 100 parts by weight of these two components the polyester will constitute 20 to 90 parts. The maleic anhydride should be employed in a ratio within a range of ¼ to 20 or 45.4 parts by weight per 100 parts of styrene-polyester mixture.

Temperatures of cure preferably attain a range of at least 180 or 200° F. mold temperature, and may be much higher, for example, up to 275 or 300° F. or other temperatures so long as the product is not excessively discolored, or the components volatilized to an excessive degree.

Time of cure is variable dependent upon numerous factors, such as the hardness desired in the final product, the amount of catalyst in the mixture and the thickness of the bodies being cured. Thin plates and films naturally heat up more rapidly than massive articles and require less curing time. Plates up to about ¼ inch in thickness will adequately cure in about 5 to 30 minutes and most massive articles may require a total of several hours, e. g. up to 5 or 6 hours.

Prolongation of the final heating period after the cure is completed is permissible but usually is uneconomical in commercial operations.

Catalysts usually are desirable in the polymerizable mixtures but may be omitted if speed of cure is not an object. Catalysts are of the type commonly employed in addendum reactions involving polymerization by addition of unsaturated bonds. Usually the catalysts include a peroxide such as benzoyl peroxide, diacetylperoxide, tertiary butyl hydroperoxide, tertiary butyl peroxide, acetyl benzoyl peroxide and tertiary butyl perbenzoate. These may be employed in appropriate ratio, e. g. .05 to 5% weight of resinifiable mixture.

The following are typical of mixtures of the esters with styrene and α,β-dicarboxylic, α,β-unsaturated acids or anhydrides which can be prepared and polymerized in accordance with the provisions of the invention.

| Composition | | Reaction Conditions | | |
|---|---|---|---|---|
| Parts by weight | Compound | Time in Hours | Temperature, Degrees C. | Description of the Product |
| EXAMPLE I [1] | | | | |
| 15 | Maleic Anhydride | 15 | 100 | Hard, translucent. |
| 18 | Styrene | | | |
| 15 | Diethylene Glycol ester of endomethylene tetrahydrophthalic anhydride. | | | |
| .06 | Benzoyl Peroxide | | | |
| EXAMPLE II | | | | |
| 35 | Diethylene glycol ester of endomethylene tetrahydrophthalic acid. | 2 | 60 | Extremely hard and tough. |
| 18 | Styrene | | | |
| 15 | Maleic anhydride | | | |
| .06 | Benzoyl peroxide | | | |
| EXAMPLE III | | | | |
| 35 | Triethylene glycol ester of endomethylene tetrahydrophthalic acid. | 6 | 100 | Hard, translucent resin. |
| 18 | Styrene | | | |
| 15 | Maleic anhydride | | | |
| .06 | Benzoyl peroxide | | | |
| EXAMPLE IV | | | | |
| 35 | Tetraethylene glycol ester of endomethylene tetrahydrophthalic acid. | 15 | 100 | Very hard surface. |
| 18 | Styrene | | | |
| 15 | Maleic anhydride | | | |
| .06 | Benzoyl peroxide | | | |

In Examples II, III and IV the maleic anhydride is in a proportion of 28.3 parts per 100 parts of styrene and polyester mixture.

The compositions in the following examples were used to cast sheets of plastic according to the following procedure: The components of the mixtures were stirred (with warming if necessary) and the well-mixed liquids were poured into a cell consisting of two pieces of plate glass separated by a synthetic rubber gasket ⅛ inch thick. The cell was placed in an oven at 167° F. for sixty minutes, after which the oven temperature was raised to 250° F. for 60 minutes. This schedule is more than enough to completely cure the examples listed below:

*Example V*

| | Parts |
|---|---|
| Ethylene glycol polyester of endomethylene tetrahydrophthalic acid | 70 |
| Styrene | 30 |
| Maleic Anhydride | ¼ |
| Benzoyl peroxide | 2.5 |

This composition cures to give a clear rigid light-colored hard plastic.

*Example VI*

| | Parts |
|---|---|
| Diethylene glycol polyester of endomethylene tetrahydrophthalic acid | 20 |
| Styrene | 80 |
| Maleic Anhydride | 10 |
| Benzoyl peroxide | 2.5 |

The resin from this mixture is rigid, hard and very slightly translucent.

*Example VII*

| | Parts |
|---|---|
| Propylene glycol polyester of endomethylene tetrahydrophthalic acid | 80 |
| Styrene | 20 |
| Maleic anhydride | 1 |
| Diacetyl peroxide | 2.5 |

The fully cured resin is a very hard clear rigid structure.

*Example VIII*

| | Parts |
|---|---|
| Diethylene glycol polyester of an equimolar mixture of endomethylene tetrahydrophthalic and phthalic acids | 90 |
| Styrene | 10 |
| Maleic anhydride | 2 |
| Benzoyl peroxide | 2.5 |

The cured composition is a soft transparent adhesive resin.

*Example IX*

| | Parts |
|---|---|
| Ethylene glycol (1 mol), diethylene glycol (9 mols) polyester of endomethylene tetrahydrophthalic acid | 60 |
| Styrene | 40 |
| Maleic anhydride | 20 |
| Benzoyl peroxide | 2.5 |

The cured resin is moderately flexible and slightly translucent.

In these examples, maleic anhydride can be replaced by chloromaleic anhydride, tetrachloromaleic anhydride, or methyl substituted maleic anhydride and the endomethylene tetrahydrophthalic esters of dihydroxy alcohols can be replaced by the corresponding tetrahydrophthalic anhydride esters. A part of the tetrahydrophthalic anhydride or its endomethylene, homologue in the polyesters can also be replaced by maleic anhydride, fumaric acid or by such saturated dicarboxylic acid anhydride as succinic anhydride or adipic anhydride. Of course, the saturated acids can also be mixed with some maleic or fumaric acid. In general, the replacement of tetrahydrophthalic anhydride or the endomethylene homologue will be within a range of 10 to 75%.

The mixtures, before or during polymerization may be poured into molds of suitable configuration and there hardened. They may also be employed to impregnate cloth or fibers such as spun glass, cotton, or the like. The impregnated material can then be polymerized under pressure to form hard, durable laminates or the like.

The following constitute generalized conditions for the preparation of (X) laminates and (Y) massive castings. The polymerizable mixtures employed may be any of the formulations previously described.

(X) In laminating applications, fabric is soaked in the resin monomers and the impregnated pieces are placed in a pile between two platens. The resins will be completely cured in 5 to 30 minutes at platen temperatures of 200 to 275° F. when the thickness of the finished laminate is ¼ inch or less.

(Y) In casting applications it is desirable to allow the monomers to set up or gel at relatively low temperatures and to follow this with a further cure at relatively higher temperatures. The catalyzed resins are gelled in the mold at from 120 to 170° F. (mold temperature) for from 15 to 180 minutes followed by a cure at 200 to 275° F. (mold temperature) for from 30 to 120 minutes. In the case of casting applications, the use of from .05 to 1% tertiary butyl hydroperoxide is recommended in place of the benzoyl peroxide as given in the examples.

The embodiments of the invention herein described are merely by way of example. It will be apparent to those skilled in the art that numerous modifications may be made therein without departure from the spirit of the invention or the scope of the appended claims.

I claim:

1. A process of preparing a new resinous product which comprises conjointly polymerizing by heating approximately 15 parts maleic anhydride, 18 parts styrene, 15 to 35 parts diethylene glycol ester of endomethylene 1, 2, 3, 6 tetrahydrophthalic acid.

2. A process of preparing a new resinous product which comprises conjointly polymerizing approximately 15 parts maleic anhydride, 18 parts styrene, 15 to 35 parts diethylene glycol ester of endomethylene 1, 2, 3, 6 tetrahydrophthalic acid by heating the mixture to a temperature of approximately 60 to 100° C.

3. A process of preparing a resinous product which comprises heating a mixture of an $\alpha,\beta$-unsaturated, $\alpha,\beta$-dicarboxylic acid, a polyester of an alkane diol and endomethylene delta 4 tetrahydrophthalic acid and styrene to a temperature of 180 to 300° F. for a period of about five minutes to five hours dependent upon the thickness and hardness of the product; the ratios of the components being ¼ to 20 parts by weight $\alpha,\beta$-unsaturated, $\alpha,\beta$-dicarboxylic acid, styrene and polyester together being 100 parts by weight, the proportion of the polyester being ¼ to 9 times by weight that of the styrene.

4. A process of preparing a resinous product which comprises heating a mixture of an $\alpha,\beta$-unsaturated, $\alpha,\beta$-dicarboxylic acid, a polyester of a dihydroxy ether of an alkane diol and endomethylene delta 4 tetrahydrophthalic acid and styrene to a temperature of 180 to 300° F. for a period of about five minutes to five hours dependent upon the thickness and hardness of the product; the ratios of the components being ¼ to 20 parts by weight, $\alpha,\beta$-unsaturated, $\alpha,\beta$-dicarboxylic acid, styrene and polyester together being 100 parts by weight, the proportion of the polyester being ¼ to 9 times by weight that of the styrene.

5. A process of preparing a resinous product which comprises heating a mixture of maleic anhydride, a polyester of an alkane diol and endomethylene delta 4 tetrahydrophthalic acid and styrene to a temperature of 180 to 300° F. for a period of about five minutes to five hours dependent upon the thickness and hardness of the product; the ratios of the components being ¼ to 20 parts by weight, $\alpha,\beta$-unsaturated, $\alpha,\beta$-dicarboxylic acid, styrene and polyester together being 100 parts by weight, the proportion of the polyester being ¼ to 9 times by weight that of the styrene.

6. As a new resinous product, the copolymer of styrene, a compound of a class consisting of alpha beta ethylenically unsaturated, alpha beta dicarboxylic acids and the anhydrides thereof and a polyester of an alcohol of a class consisting of alkane diols and the dihydric ethers thereof and endomethylene $\Delta$ 4 tetrahydrophthalic anhydride, the components of said resin being in the proportions of ¼ to 45.4 parts of alpha beta ethylenically unsaturated, alpha beta dicarboxylic acid and the styrene and the polyester together constituting 100 parts, of which the polyester constitutes 20 to 90 parts.

7. A resinous product as defined in claim 6 in which 10 to 75% of the endomethylene $\Delta$ 4 tetrahydrophthalic acid of the polyester is replaced by a saturated dicarboxylic acid.

8. A resinous product as defined in claim 6, in which endomethylene delta 4 tetrahydrophthalic acid is replaced by phthalic acid to the extent of one mol of the latter per mol of the former.

9. A resinous product as defined in claim 6 in which 10 to 75% of the endomethylene delta 4 tetrahydrophthalic acid of the polyester is replaced by an acid of a class consisting of a saturated dicarboxylic acid and phthalic acid.

HOWARD L. GERHART.

REFERENCES CITED

The following references are of record in the file of this patent:

UNITED STATES PATENTS

| Number | Name | Date |
|---|---|---|
| 2,319,826 | Pellett | May 25, 1943 |
| 2,359,038 | Hopff | Sept. 26, 1944 |
| 2,361,019 | Gerhart | Oct. 24, 1944 |
| 2,369,689 | Robie | Feb. 20, 1945 |
| 2,421,876 | Gerhart | June 10, 1947 |